Jan. 24, 1961

J. MARLEY 2,969,470

ALTERNATING-SIGNAL GENERATOR

Filed Sept. 3, 1957

2 Sheets-Sheet 1

Jan. 24, 1961

J. MARLEY 2,969,470

ALTERNATING-SIGNAL GENERATOR

Filed Sept. 3, 1957

2 Sheets-Sheet 2

United States Patent Office 2,969,470
Patented Jan. 24, 1961

2,969,470

ALTERNATING-SIGNAL GENERATOR

John Marley, Fort Wayne, Ind., assignor to Hazeltine Research, Inc., a corporation of Illinois Filed Sept. 3, 1957, Ser. No. 681,674

7 Claims. (Cl. 307—88.5)

GENERAL

Figure 1:
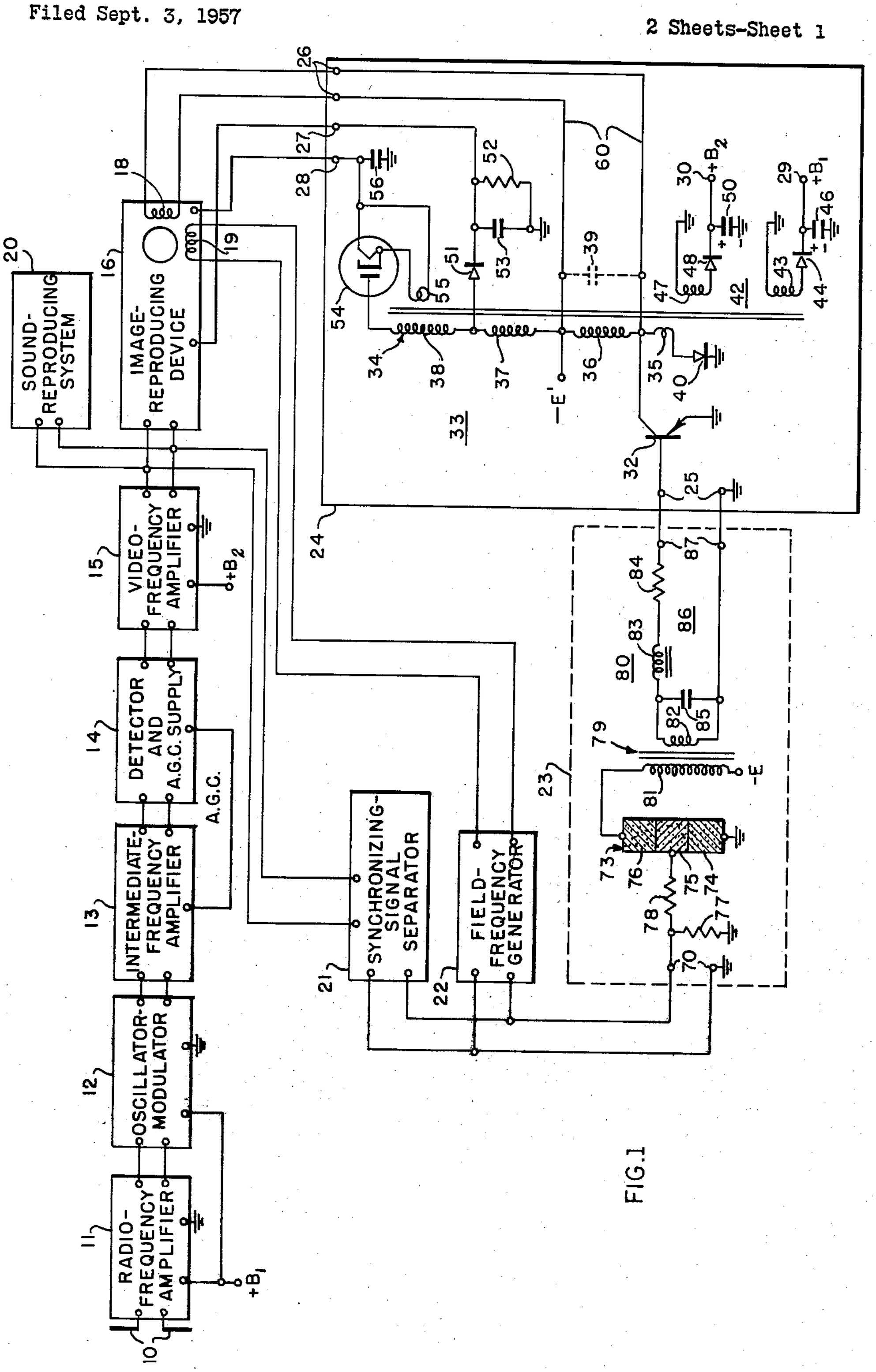

The present invention is directed to alternating-signal generators such as sine-wave generators which are particularly adapted for use in transistorized television receivers.

Transistors offer a number of advantages over electron tubes and their use has become rather prevalent in radio apparatus such as portable radio receivers. Transistors are characterized by their especially small size, lightness of weight, ruggedness, long operating life, extremely simple power requirements, and zero warm-up time. As a result, designers of television receiver equipment are giving transistors widespread use wherever possible in television receivers.

The present state of the transistor art indicates that television receivers of the near future will be of a hybrid design such that some sections of the receiver will use electron tubes while others will employ transistors. Operating requirements of electron tubes and transistors are quite different, the tubes demand voltages of about 50 to 150 volts while transistors require about 12 volts for energizing purposes. From the standpoint of economy of parts and efficient operation, it would seem desirable to derive such decidedly different voltages from the same energy-supply apparatus. A convenient source of energy in the television receiver is the line-scanning system which is useful in not only deriving a line-scanning wave from the cathode-ray tube but also the very high anode voltage therefor. Electron tubes heretofore have been employed in line-scanning systems for deriving both the scanning wave and the voltage just mentioned.

Applicant's copending application Serial No. 662,517, filed May 29, 1957, now abandoned and entitled "Energy-Supply Apparatus," and application Serial No. 662,516, now abandoned filed concurrently therewith, and entitled "System for Generating A Periodic Scanning Current," disclose and claim a power-supply system and a line-scanning system employing junction transistors for use in transistorized television receivers. For their operation these systems require an alternating-signal generator which is responsive to the line-synchronizing pulses for developing a sine wave having the line-scanning frequency. These line-scanning pulses have a duration which is about 8 percent of the scanning period and hence have an energy content so low that it is quite difficult to develop a satisfactory sine wave therefrom without taking special measures. The alternating-signal generator of the present invention is particularly adapted to develop from the line-synchronizing pulses a sine wave for application to the transistorized systems of the type disclosed in applicant's above-identified copending applications.

It is an object of the invention, therefore, to provide a new and improved alternating-signal generator employing a junction transistor.

It is another object of the invention to provide a new and improved alternating-signal generator suitable for use in conjunction with the line-scanning or voltage-supply system of a television receiver employing transistors in the system just mentioned.

It is a further object of the invention to provide a new and improved sine-wave generator which makes use of the hole- or carrier-storage phenomenon occurring in junction transistors.

In accordance with a particular form of the present invention, an alternating-signal generator comprises a junction transistor having input and output electrodes and exhibiting a carrier-storage characteristic at a predetermined frequency and energizing means coupled to those output electrodes. The generator further includes means coupled to the aforesaid input electrodes for rendering the transistor normally nonconductive, and additional means coupled to the input electrodes for applying thereto periodic pulses having the aforesaid predetermined frequency. The pulse duration intervals are much less than the pulse separation intervals, and the polarity of each pulse causes the transistor to conduct and store carriers during the pulse duration. The carrier-storage characteristic of the transistor is such that the stored carriers flow out therefrom to maintain it conductive during a much longer portion of each subsequent pulse separation interval. The alternating-signal generator additionally includes a load circuit coupled to the output electrodes and including a circuit resonant at a frequency related to the aforesaid predetermined frequency and responsive to the stored carriers for developing an alternating signal having the above-mentioned resonant frequency.

For a better understanding of the present invention, together with other and further objects thereof, reference is had to the following description taken in connection with the accompanying drawings, and its scope will be pointed out in the appended claims.

Figure 2:
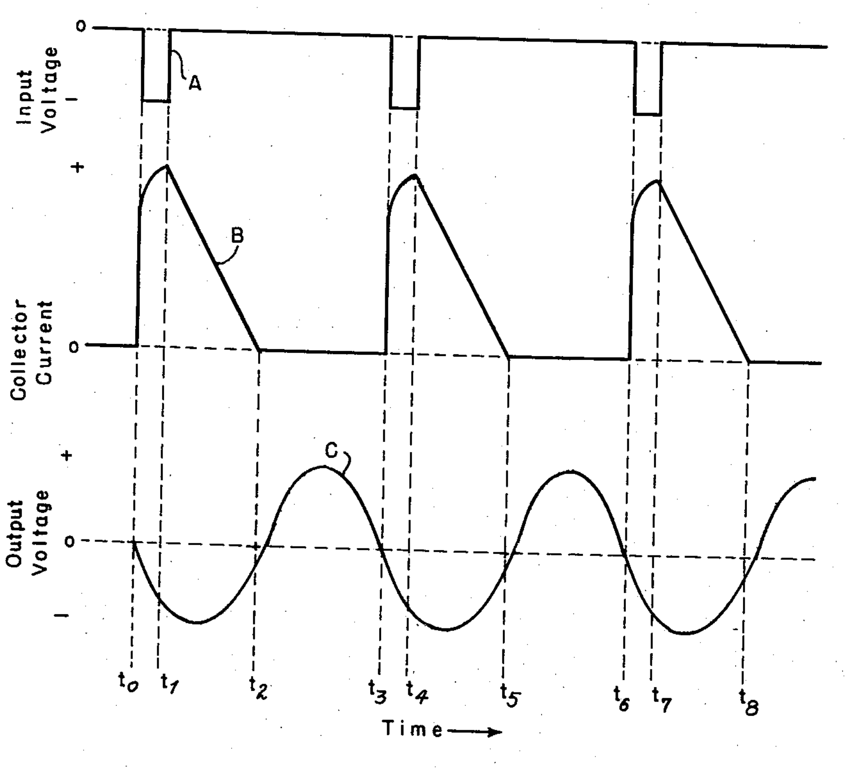

Referring to the drawings:

Fig. 1 is a circuit diagram, partly schematic, of a complete television receiver including an alternating-signal generator in accordance with a particular form of the present invention, and Fig. 2 is a graph utilized in explaining the operation of the Fig. 1 alternating-signal generator.

*General description of receiver of Fig. 1*

Referring now more particularly to Fig. 1 of the drawings, the television receiver there represented comprises a receiver of the superheterodyne type including an antenna system 10 coupled to a radio-frequency amplifier 11 of one or more stages. There are coupled to the latter in cascade, in the order named, an oscillator-modulator 12, an intermediate-frequency amplifier 13 of one or more stages, a detector and automatic-gain-control or AGC unit 14, a video-frequency amplifier 15 of one or more stages, and cathode-ray tube image-reproducing device 16 of conventional construction provided with the usual line-frequency and field-frequency scanning windings 18 and 19, respectively, for deflecting the cathode-ray beam in two directions normal to each other. The AGC supply unit 14 is connected to the input circuit of at least the first stage of the intermediate-frequency amplifier 13 when the latter includes transistors as will be mentioned hereinafter. Connected to the output terminals of the video-frequency amplifier 15 is a conventional intercarrier sound-signal reproducing system 20 which includes the usual 4.5 megacycle signal selector, frequency detector, audio-frequency amplifier, and loudspeaker.

The output circuit of the video-frequency amplifier 15 is coupled through a synchronizing-signal separator 21 to the input circuit of a field-frequency generator 22 and to input terminals 70, 70 of an alternating-signal or sine-wave generator 23 in accordance with the present invention. The output circuit of the field-frequency generator 22 is coupled to the field-scanning winding 19 while output terminals 87, 87 of the alternating-signal generator 23 are coupled to a pair of input terminals 25, 25 of a combined energy-supply and line-scanning system 24. The portion of the latter which is represented in the drawings is constructed in accordance with the teachings of the above-identified copending applications and reference is made thereto for complete details of structure and operation. Briefly, however, system 24 includes a junction transistor 32, such as a type 2N174 alloy-junction power transistor, having emitter-base input electrodes connected to the terminals 25, 25 and collector-emitter output electrodes connected in a manner to be described subsequently. System 24 comprises a load circuit 33 including an autotransformer 34 having a plurality of winding portions 35, 36, 37, and 38. The line-scanning winding 18 is connected to the winding portion 36 through a pair of output terminals 26, 26 and connections 60, 60. Condenser 39, which may be in whole or in part the inherent capacitance associated with the transformer windings and hence is represented in broken line construction, is connected in parallel with the portion 36 and is resonant with the line-scanning winding 18 at a frequency several times that of the line-scanning frequency. The load circuit 33 also comprises a direct-current circuit which includes a unidirectional supply means represented as a source —E′ of about 12 volts, the winding portions 36 and 35, and a unidirectionally conductive device which is a semiconductor junction diode 40 connected between one terminal of the winding portion 35 and ground. The winding portion 35 preferably includes a few turns for developing a small potential which aids in rendering the diode 40 conductive during the operating cycle of the system 24. The diode 40 is poled to conduct during trace intervals. The junction of the winding portions 35 and 36 is connected to the collector electrode of transistor 32.

The load circuit 33 also includes a potential-supply system 42 which, in turn, includes a winding 43 inductively coupled to the previously identified winding portion 36 and which also includes a unidirectionally conductive device or diode 44 responsive to the potential developed in the winding 43 during trace intervals of the saw-tooth current developed at winding 18 for deriving a first unidirectional potential having a value different from that of the supply means —E′. One terminal of the winding 43 is grounded while the other terminal is connected through the diode 44 to an output terminal 29 and to ground through a filter condenser 46. The turns ratio of the winding 43 and the winding portion 36 is such that there is developed at the terminal 29 a voltage $+B_1$ of a magnitude suitable for application to the terminal $+B_1$ of the radio-frequency amplifier 11 and the oscillator-modulator 12. The potential-supply system 42 may also include another rectifier arrangement similar to the one just described for developing a voltage $+B_2$ for application by terminal 30 to the terminal $+B_2$ of the video-frequency amplifier 15. To this end, the rectifier arrangement includes a winding 47, a diode 48 similar to the diode 44, and a filter condenser 50 as represented.

At this time it should be stated that it is assumed that the various signal-translating stages of the intermediate-frequency amplifier 13, sound-reproducing sysem 20, the synchronizing-signal separator 21, the field-frequency generator 22, and the alternating-signal generator 23 employ transistors so that low operating potentials of about 12 volts are required by those units. It will also be assumed that the radio-frequency amplifier 11, the oscillator-modulator 12, and video-frequency amplifier 15 employ electron tubes, thus necessitating considerably higher operating potentials for the anode circuits, which potentials are designated $+B_1$ and $+B_2$ as represented and are supplied as stated by the system 24 along with line-scanning waves and the operating potentials for the first and second anodes of the image-reproducing device 16. The circuits for developing these anode operating potentials of the device 16 will be described hereinafter.

The load circuit of system 24 further includes a high voltage recetifier system including a diode 54 having its anode connected to the high voltage terminal of winding portion 38 and its cathode connected to ground through a storage condenser 56 and to an output terminal 28 which supplies a high unidirectional potential to the second anode of the image-reproducing device 16. An auxiliary transformer winding 55 supplies current to the filament of the diode 54. An operating potential for the accelerating electrode of device 16 is developed by a peak-rectifying system which includes a crystal diode 51 having one terminal connected to the junction of the winding portions 37 and 38 and its other terminal connected to an output terminal 27 and to ground through a filter network 52, 53. The rectifier 51 is poled to conduct the positive-going pulses developed during retrace intervals of the scanning wave supplied to the line-scanning winding of the device 16.

The units 10–16, inclusive, and 20–22, inclusive, may be of conventional construction and operation so that a detailed description and explanation of the operation thereof are deemed unnecessary herein.

*General operation of Fig. 1 receiver*

Considering briefly the general operation of the above-described receiver as a whole, signals intercepted by the antenna system 10 are selected and amplified in the radio-frequency amplifier 11 and are supplied to the oscillator-modulator 12 wherein they are converted to intermediate-frequency signals. The latter, in turn, are selectively amplified by the intermediate-frequency amplifier 13 and are delivered to the detector and automatic-gain-control supply of unit 14. The modulation components of the signal are derived by the detector of unit 14 and are supplied to the video-frequency amplifier 15 wherein they are then amplified and supplied to the brilliancy control electrode of the image-reproducing device 16. A control voltage derived by the automatic-gain-control supply of unit 14 is applied as an automatic-amplification-control bias to the gain-control circuit of the first intermediate-frequency amplifier stage of unit 13 to maintain the signal input to the detector of unit 14 within a relatively narrow range for a wide range of received signal intensities.

Unit 21 selects the synchronizing signals from the other modulation components of the composite video-frequency signal applied thereto from the video-frequency amplifier 15. The line-synchronizing and the field-synchronizing pulses derived by the separator 21 are then supplied to the respective ones of the generators 22 and 23 to synchronize the operation thereof. Generator 23 develops a sine-wave voltage at line-scanning frequency for application to the combined line-scanning and energy-supply system 24 to control the operation thereof. Operating potentials for units 11, 12, and 15 and designated as $+B_1$ and $+B_2$ are developed in system 24 at terminals 29 and 30 as explained in applicant's above-identified copending applications. Similarly, system 24 develops at terminals 27 and 28 the various high voltage potentials for application to the image-reproducing device 16. An electron beam is produced by the cathode-ray image-reproducing device 16 and the intensity of this beam is controlled in accordance with the video frequency and the control voltages impressed on the brilliancy-control electrode from the video-frequency amplifier 15. Saw-tooth current waves generated in the field-frequency generator 22 and in the system 24 are applied to the scanning windings 19 and 18 of unit 16 to produce scanning fields, thereby to deflect the cathode-ray beam of that unit in two directions normal to each other to trace a rectilinear scanning pattern on the screen of the tube and thereby reconstruct the translated picture.

The sound signal is applied by the video-frequency amplifier 15 to the sound-signal reproducing system 20 wherein the audio-frequency modulation components are derived in a conventional manner by the frequency detector of that unit and are then applied to the audio-frequency amplifier thereof for amplification and application to the loudspeaker for conversion to sound.

*Description of alternating-signal generator 23 of Fig. 1*

Referring now to the alternating-signal or sine-wave generator 23 of Fig. 1, that generator comprises a junction transistor such as a PNP germanium alloy-junction power transistor 73 having the usual input and output electrodes and exhibiting a carrier- or hole-storage characteristic at a predetermined frequency such as at the line-scanning frequency of the television receiver. More particularly, the transistor 73 has emitter-base input electrodes and collector-emitter output electrodes. The transistor is represented diagrammatically as having an emitter region 74, a base region 75, and a collector region 76, the emitter region being grounded while the collector and emitter regions are interconnected through the primary winding 81 of an impedance-matching transformer 79 and through an energizing means represented as a source or battery —E, the positive terminal of which is grounded.

The sine-wave generator 23 also includes means coupled to the emitter-base input electrodes of the transistor 73 for applying thereto periodic pulses having the aforesaid predetermined or line-scanning frequency, durations much less than those of the pulse separations of the periodic pulses, and such polarity as alternately to render the transistor conductive and nonconductive alternately to store carriers in the base region 75 of the transistor for intervals much greater than at the aforesaid durations and to remove carriers from the base region. This periodic pulse applying form comprises the input terminals 70, 70, one of which is grounded while the other terminal is connected to the base region 75 through a base-current controlling resistor 78. The ungrounded one of the terminals just mentioned is connected to ground through a resistor 77 which with resistor 78 and the input impedance of transistor 73 may effectively match the output impedance of the synchronizing-signal separator 21.

The generator 23 further comprises a load circuit 80 which is coupled to the output or collector-emitter electrodes of transistor 73 and includes a circuit 86 resonant at a frequency related to the above-mentioned predetermined frequency and responsive to carriers stored in the base region 75 for developing an alternating signal having the above-mentioned resonant frequency. The load circuit 80 includes the impedance-matching transformer 79 with its primary winding 81 and step-down secondary winding 82 and the resonant circuit 86. The latter comprises a condenser 85 together with an inductor 83, a small resistor 84, and the small base-emitter resistance of the transistor 32. For the television application under consideration, the tuned circuit 86 is resonant at the line-scanning frequency although for other applications it will be understood that its resonant frequency may be $n$ times that of the frequency of the pulses applied to the input terminals of the circuit where $n$ is an integer. Thus, for some applications the tuned circuit 86 may be resonant at a harmonic of the signal applied to the input terminals of the generator 23. The condenser 85 has a relatively large capacitance and is connected in parallel with the secondary winding 82 of the transformer 79. The output terminals 87, 87 of generator 23 are connected directly to the input terminals 25, 25 of unit 24, one terminal of each of the pairs being grounded. The tuned circuit 86 effectively comprises a series-resonant circuit which includes resistive elements affording a very low resistive impedance and this tuned circuit has a relatively high Q in the range of 8–10.

*Operation of generators 23 of Fig. 1*

In considering the operation of the generator 23 of Fig. 1, reference is made to the curves of Fig. 2 which will be helpful in understanding the operation of that generator. Since the described transistor 73 is of the PNP type, negative polarity pulses represented by curve A of Fig. 2 and occurring at the line-scanning frequency are applied to the input terminals 70, 70 of generator 23. A junction power transistor such as the type 2N158 under consideration exhibits a carrier-storage characteristic at the line-scanning frequency. During the pulse intervals $t_0$—$t_1$, $t_3$—$t_4$, and $t_6$—$t_7$, the transistor 73 is driven sufficiently hard that the collector current rises to sturaion and carrier storage takes place in the base region 75. When the pulses of curve A end at times $t_1$, $t_4$, and $t_7$, the carriers developed in the region of the base-collector junction are not completely swept out of the base zone and hence continue to drift across that junction for a considerable interval of time until they are depleted. The collector current of the transistor has the wave form represented by curve B of Fig. 2 and it will be seen from the shape of the current wave during the intervals $t_1$—$t_2$, $t_4$—$t_5$, and $t_7$—$t_8$ that the collector current decays linearly until it ceases altogether at times $t_2$, $t_5$, and $t_8$. The durations of the pulse intervals $t_0$—$t_1$, $t_3$—$t_4$, and $t_6$—$t_7$ are approximately 5 microseconds whereas the durations $t_0$—$t_2$, $t_3$—$t_5$, and $t_6$—$t_8$ of the pulses of collector current represented by curve B are between 20 and 30 microseconds.

The current pulses of curve B effectively drive the tuned circuit 86 which is resonant at line-scanning frequency and develop therein the sine wave represented by curve C of Fig. 2. The peak-to-peak amplitude of this sine wave developed across an impedance of a few ohms is several times that of the amplitude of the negative polarity pulses of curve A applied to the input terminals 70, 70. Input pulses such as those of curve A, if applied directly to the tuned circuit 86, would have insufficient energy content to excite the tuned circuit. However, the transistor 73, by virtue of its high power-handling capabilities and high amplification coupled with the carrier-storage characteristic which it exhibits at the line-scanning frequency, impresses the substantial signal of curve B with its large duty cycle on the tuned circuit 86 so that it, in turn, develops a large sine-wave signal for application to the input terminals 25, 25 of the combined line-scanning and energy-supply system 24. Consequently, the latter is caused to function satisfactorily to develop the several unidirectional potentials of various magnitudes for application to various units of the television receiver in addition to deriving a saw-tooth current wave for application to the line-scanning winding 18 of the cathode-ray image-reproducing device 16.

While applicant does not wish to be limited to any particular circuit constants, the following have proved to be useful in the sine-wave generator 23 of Fig. 1:

| | | |
|---|---|---|
| Resistor **77** | ohms | 75 |
| Resistor **78** | do | 82 |
| Resistor **84** | do | 2 |
| Condenser **85** | microfarads | 2 |
| Inductor **83** | microhenries | 50 |
| Tuned circuit **86**: | | |
| Resonant frequency | kilocycles | 15.75 |
| Q | | 8–10 |
| Transformer **79**: | | |
| Winding **81** | | 60 turns enameled No. 30 wire. |
| Winding **82** | | 20 turns enameled No. 30 wire. |

Both on 1-inch diameter re-entrant core leg of enclosing ferrite transformer core

| | |
|---|---|
| —E | —10 to —12 volts |
| Transistor 73 | CBS type 2N158 PNP germanium alloy-junction power transistor |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. An alternating-signal generator comprising: a junction transistor having input and output electrodes and exhibiting a carrier-storage characteristic at a predetermined frequency; energizing means coupled to said output electrodes; means coupled to said input electrodes for rendering said transistor normally nonconductive; further means coupled to said input electrodes for applying thereto periodic pulses having said predetermined frequency, the pulse duration intervals being much less than the pulse separation intervals and the polarity of each pulse causing said transistor to conduct and store carriers durings the pulse duration; the carrier-storage characteristic of said transistor being such that the stored carriers flow out therefrom to maintain it conductive during a much longer portion of each subsequent pulse separation interval; and a load circuit coupled to said output electrodes and including a circuit resonant at a frequency related to said predetermined frequency and responsive to said stored carriers for developing an alternating signal having said resonant frequency.

2. An alternating-signal generator comprising: a junction transistor having input and output electrodes and exhibiting a carrier-storage characteristic at a predetermined frequency; energizing means coupled to said output electrodes; means coupled to said input electrodes for rendering said transistor normally nonconductive; further means coupled to said input electrodes for applying thereto periodic pulses having said predetermined frequency, the pulse duration intervals being much less than the pulse separation intervals and the polarity of each pulse causing said transistor to conduct and store carriers during the pulse duration; the carrier-storage characteristic of said transistor being such that the stored carriers flow out therefrom to maintain it conductive during a much longer portion of each subsequent pulse separation interval; and a load circuit coupled to said output electrodes and including a circuit resonant at a frequency $n$ times said predetermined frequency, where $n$ is an integer, and responsive to said stored carriers for developing an alternating signal having said resonant frequency.

3. An alternating-signal generator comprising: a junction transistor having input and output electrodes and exhibiting a carrier-storage characteristic at a predetermined frequency; energizing means coupled to said output electrodes; means coupled to said input electrodes for rendering said transistor normally nonconductive; further means coupled to said input electrodes for applying thereto periodic pulses having said predetermined frequency, the pulse duration intervals being much less than the pulse separtion intervals and the polarity of each pulse causing said transistor to conduct and store carriers during the pulse duration; the carrier-storage characteristic of said transistor being such that the stored carriers flow out therefrom to maintain it conductive during a much longer portion of each subsequent pulse separation interval; and a load circuit coupled to said output electrodes and including a circuit resonant at a frequency equal to said predetermined frequency and responsive to said stored carriers for developing an alternating signal having said resonant frequency.

4. A sine-wave generator for a television receiver comprising: a junction transistor having input and output electrodes and exhibiting a carrier-storage characteristic at line-scanning frequency; energizing means coupled to said output electrodes; means coupled to said input electrodes for rendering said transistor normally nonconductive; further means coupled to said input electrodes for applying thereto periodic pulses having said line-scanning frequency, the pulse duration intervals being much less than the pulse separation intervals and the polarity of each pulse causing said transistor to conduct and store carriers during the pulse duration; the carrier-storage characteristic of said transistor being such that the stored carriers flow out therefrom to maintain it conductive during a much longer portion of each subsequent pulse separation interval; and a load circuit coupled to said output electrodes and including a circuit resonant at said line-scanning frequency and responsive to said stored carriers for developing a sine wave having said frequency.

5. An alternating-signal generator comprising: a junction transistor having emitter-base input electrodes and collector-emitter output electrodes and exhibiting a carrier-storage characteristic at a predetermined frequency; energizing means coupled to said output electrodes; means coupled to said input electrodes for rendering said transistor normally nonconductive; further means coupled to said input electrodes for applying thereto periodic pulses having said predetermined frequency, the pulse duration intervals being much less than the separation intervals and the polarity of each pulse causing said transistor to conduct and store carriers during the pulse duration; the carrier-storage characteristic of said transistor being such that the stored carriers flow out therefrom to maintain it conductive during a much longer portion of each subsequent pulse separation interval; and a load circuit coupled to said output electrodes and including a circuit resonant at a frequency related to said predetermined frequency and responsive to said stored carriers for developing an alternating signal having said resonant frequency.

6. An alternating-signal generator comprising: a junction power transistor having emitter-base input electrodes and collector-emitter output electrodes and exhibiting a carrier-storage characteristic at a predetermined frequency; energizing means coupled to said output electrodes; means coupled to said input electrodes for rendering said transistor normally nonconductive; further means coupled to said input electrodes for applying thereto periodic pulses having said predetermined frequency, the pulse duration intervals being much less than the pulse separation intervals and the polarity of each pulse causing said transistor to conduct and store carriers during the pulse duration; the carrier-storage characteristic of said transistor being such that the stored carriers flow out therefrom to maintain it conductive during a much longer portion of each subsequent pulse separation interval; and a load circuit coupled to said output electrodes and including a high Q circuit resonant at a frequency related to said predetermined frequency and responsive to said stored carriers for developing with substantial power gain an alternating signal having said resonant frequency.

7. A sine-wave generator for a television receiver comprising: a PNP junction power transistor having emitter-base input electrodes and collector-emitter output electrodes and exhibiting a carrier-storage characteristic at line-scanning frequency; energizing means coupled to said output electrodes; means coupled to said input electrodes for rendering said transistor normally nonconductive; further means coupled to said input electrodes for applying thereto periodic pulses having said line-scanning frequency, the pulse duration intervals being much less than the pulse separation intervals and each pulse being of negative polarity with relation to said base electrode to cause said transistor to conduct and store carriers in said base region during the pulse duration; the carrier-storage characteristic being such that the stored carriers flow out therefrom to maintain it conductive during a much longer portion of each subsequent pulse separation interval; and a load circuit coupled to said output electrodes and including a circuit resonant at said line-scanning frequency and responsive to said stored carriers for developing with substantial power gain a sine wave having said resonant frequency.

References Cited in the file of this patent

UNITED STATES PATENTS

| | | |
|---|---|---|
| 2,760,109 | Schade | Aug. 21, 1956 |
| 2,777,057 | Pankove | Jan. 8, 1957 |
| 2,787,717 | Kasmir | Apr. 2, 1957 |
| 2,801,338 | Keller | July 30, 1957 |
| 2,820,152 | Mathis et al. | Jan. 14, 1958 |
| 2,830,199 | Mofenson | Apr. 8, 1958 |
| 2,863,068 | Gitandhi | Dec. 2, 1958 |
| 2,866,925 | Wunderman | Dec. 30, 1958 |
| 2,874,311 | Turnage | Feb. 17, 1959 |
| 2,877,360 | Moore et al. | Mar. 10, 1959 |
| 2,905,815 | Goodrich | Sept. 22, 1959 |
| 2,912,655 | Wolfendale | Nov. 10, 1959 |